(12) United States Patent
Kang et al.

(10) Patent No.: US 8,349,286 B2
(45) Date of Patent: Jan. 8, 2013

(54) LITHIUM-TRANSITION METAL COMPLEX COMPOUNDS HAVING NTH ORDER HIERARCHICAL STRUCTURE, METHOD OF PREPARING THE SAME AND LITHIUM BATTERY COMPRISING AN ELECTRODE COMPRISING THE SAME

(75) Inventors: Yoonsok Kang, Seongnam-si (KR); Joungwon Park, Seongnam-si (KR); Guesung Kim, Yongin-si (KR); Jaegu Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 695 days.

(21) Appl. No.: 12/399,120

(22) Filed: Mar. 6, 2009

(65) Prior Publication Data
US 2009/0253039 A1    Oct. 8, 2009

(51) Int. Cl.
*C01D 1/02*    (2006.01)
(52) U.S. Cl. ............. 423/593.1; 423/594.15; 423/594.3; 423/594.4; 423/594.5; 423/594.6; 429/231.1; 429/231.3; 429/218.1; 252/182.1
(58) Field of Classification Search ............... 423/179.5, 423/306, 593.1, 594.15, 594.3, 594.4, 594.5, 423/594.6; 252/182.1; 429/231.1, 231.3, 429/218.1
See application file for complete search history.

(56) References Cited

U.S. PATENT DOCUMENTS

| | | | |
|---|---|---|---|
| 6,528,033 B1 * | 3/2003 | Barker et al. | 423/306 |
| 2004/0086445 A1 * | 5/2004 | Armand et al. | 423/306 |
| 2009/0233096 A1 * | 9/2009 | Schall et al. | 428/402 |

* cited by examiner

*Primary Examiner* — Mark Kopec
*Assistant Examiner* — Haidung Nguyen
(74) *Attorney, Agent, or Firm* — Stein McEwen, LLP

(57) ABSTRACT

A lithium-transition metal complex compound has an $n^{th}$ order hierarchical structure in which n type structures represented by at least one unit of $a^{th}$ order units in a range of $1 \times 10-(a+5)$ m to $10 \times 10-(a+5)$ m exist in a complex form, wherein n is a natural number that is 2 or greater, and a is a natural number in a range of 1 to 5. The lithium-transition metal complex may be prepared by heat-treating a mixture including a lithium source, a transition metal source, and solvent in contact with a natural material having a hierarchical structure. A lithium battery includes an electrode including the lithium-transition metal complex compound having the $n^{th}$ order hierarchical structure. The lithium battery can have improved rapid charging characteristics, high power characteristics, and cycle characteristics.

9 Claims, 9 Drawing Sheets

LITHIUM-TRANSITION METAL COMPLEX COMPOUNDS HAVING NTH ORDER HIERARCHICAL STRUCTURE, METHOD OF PREPARING THE SAME AND LITHIUM BATTERY COMPRISING AN ELECTRODE COMPRISING THE SAME

CROSS-REFERENCE TO RELATED APPLICATIONS

This application claims the benefit of Korean Patent Application Nos. 2008-30782, filed on Apr. 2, 2008, and 2008-96722, filed on Oct. 1, 2008, in the Korean Intellectual Property Office, the disclosure of which is incorporated herein by reference.

BACKGROUND

1. Field

One or more embodiments relate to a lithium-transition metal complex compound having an $n^{th}$ order hierarchical structure, a method of preparing the same, and a lithium battery including an electrode comprising the lithium-transition metal complex compound having an nth order hierarchical structure. More particularly, one or more embodiments relate to a lithium-transition metal complex compound having an $n^{th}$ order hierarchical structure, which is derived from a natural material, a method of preparing the same, and a lithium battery including an electrode comprising the lithium-transition metal complex compound having an $n^{th}$ order hierarchical structure.

2. Description of the Related Art

Lithium ion batteries (LiBs) have been adopted as a power source of many portable devices due to their high energy density and easy design. Recently, there has been a trend to use LiBs as a power source of electric tools, electric bicycles, and electric vehicles, in addition to portable IT devices, and thus research has been actively conducted on an active material that has high power properties and can be charged rapidly. In general, in LiBs, graphite having a high theoretical capacity and a low charge and discharge potential has been used as an anode active material. However, the charge and discharge potential of graphite is close to 0 V, and thus, an LiB using graphite cannot be charged at a rapid rate. In addition, when an LiB using graphite is too rapidly charged, Li metal may be extracted from an anode of the LiB.

To overcome these problems, lithium titanium oxides ($Li_4Ti_5O_{12}$ (LTO)) have been proposed as a new anode active material. LTOs show a stable and reversible charge/discharge curve at a potential of 1.5 V with respect to Li metal, and reach a theoretical capacity of 175 mAh/g. Moreover, the dimension of LTO is not changed by the intercalation/deintercalation of lithium ions, and thus LTO is referred to as a zero strain insertion material. In this regard, research has been actively conducted on LTOs that can be used as an active material that provides batteries with rapid charging and high power.

To increase the charge and discharge rates of LTO, the mass diffusion rate should be increased. For this, if the LTO is in nano-sized units, the specific surface area of the LTO increases, and thus a larger amount of a binder is needed for forming an electrode. In this case, the relative content of the LTO active material in an electrode is decreased, and thus the capacity of a battery including the electrode may be decreased.

SUMMARY

Additional aspects will be set forth in part in the description which follows and, in part, will be apparent from the description, or may be learned by practice of the invention.

To achieve the above and/or other aspects, one or more embodiments may include a lithium-transition metal complex compound having an $n^{th}$ order hierarchical structure in which n type structures represented by at least one unit of $a^{th}$ order units in a range of $1 \times 10^{-(a+5)}$ m to $10 \times 10^{-(a+5)}$ m exist in a complex form, wherein n is a natural number that is 2 or greater, and a is a natural number in a range of 1 to 5.

To achieve the above and/or other aspects, one or more embodiments may include a method of preparing a lithium-transition metal complex compound, the method including: providing a mixture including a lithium source, a transition metal source, and solvent; providing a natural material having a hierarchical structure as a template; and heat treating the mixture and the natural material while the mixture and the natural material contact each other to obtain a lithium-transition metal complex compound having an $n^{th}$ order hierarchical structure in which n type structures represented by at least one unit of $a^{th}$ order units in a range of $1 \times 10^{-(a+5)}$ m to $10 \times 10^{-(a+5)}$ m exist in a complex form, wherein n is a natural number that is 2 or greater, and a is a natural number in a range of 1 to 5.

To achieve the above and/or other aspects, one or more embodiments may include a lithium battery comprising an anode, a cathode, and an electrolytic solution, wherein at least one of the anode and the cathode comprises the lithium-transition metal complex compound having an $n^{th}$ order hierarchical structure as described above, or the lithium-transition metal complex compound having an nth order hierarchical structure, prepared using the method as described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
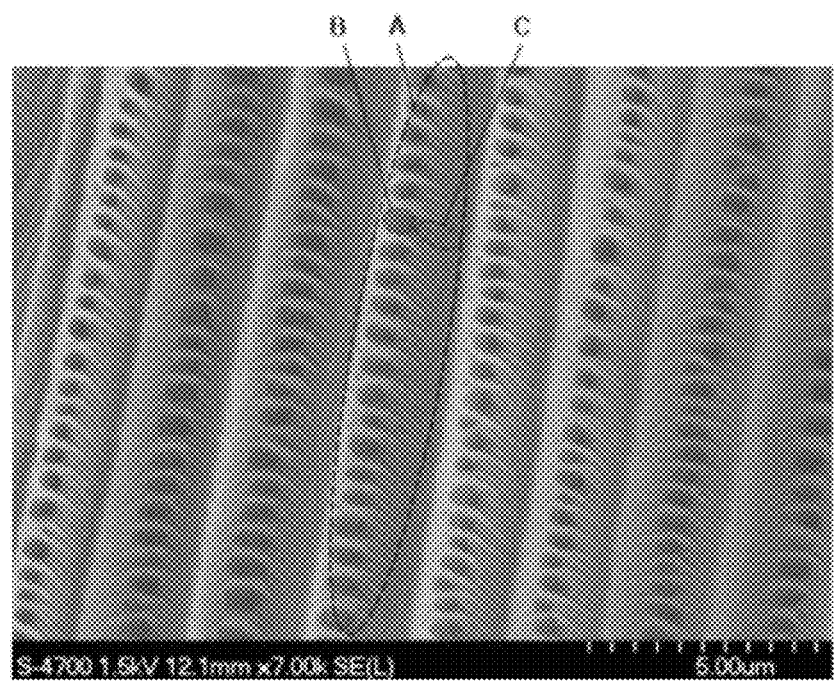
FIG. 1 is a scanning electron microscopic (SEM) image of a wing of a moth having a $3^{rd}$ order hierarchical structure.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

One or more embodiments include a lithium-transition metal complex compound having an $n^{th}$ order hierarchical structure in which n type structures represented by at least one unit of $a^{th}$ order units in a range of $1 \times 10^{-(a+5)}$ m to $10 \times 10^{-(a+5)}$ m exist in a complex form, wherein n is a natural number that is 2 or greater, and a is a natural number in a range of 1 to 5.

The term "range of $1 \times 10^{-(a+5)}$ m (meter) to $10 \times 10^{-(a+5)}$ m (meter)" used herein refers to values between $1 \times 10^{-(a+5)}$ m (meter) and $10 \times 10^{-(a+5)}$ m (meter), wherein the range includes the value of $1 \times 10^{-(a+5)}$ m (meter), but does not include the value of $10 \times 10^{-(a+5)}$ m (meter). Hereinafter, throughout the present specification including claims, the description of "range of $1 \times 10^{-(a+5)}$ m (meter) to $10 \times 10^{-(a+5)}$ m (meter)" and all the descriptions wherein a is substituted by a certain number should be understood based on the above description.

In addition, the term "$a^{th}$ order units" used herein refers to the range of $1 \times 10^{-(a+5)}$ m to $10 \times 10^{-(a+5)}$ m that can be understood as described above. For example, a $1^{st}$ order unit is in a range of $1 \times 10^{-6}$ m to $10 \times 10^{-6}$ m. In this regard, a may be a natural number ranging from 1 to 5. Hereinafter, throughout the present specification including claims, the term "$a^{th}$ order units" should be understood based on the above description.

The lithium-transition metal complex compound having an $n^{th}$ order hierarchical structure will now be described in more detail with reference to FIG. 1, which is provided as an aid to explaining the concept of an $n^{th}$ order hierarchical structure. In particular, FIG. 1 is a scanning electron microscopic (SEM) image of a wing of a moth having a $3^{rd}$ order hierarchical structure.

As shown in FIG. 1, the wing of the moth has three types of structures in a complex form, that is, a channel (refer to A of FIG. 1), a pore (refer to B of FIG. 1), and a sub-channel (refer to C of FIG. 1).

In FIG. 1, the width of each of the protruding channels A of the moth wing of FIG. 1 is about 2 μm. Thus, a protruding channel A of the moth wing may be considered to be a $1^{st}$ order unit in the range of $1 \times 10^{-6}$ m to $10 \times 10^{-6}$ m.

In FIG. 1, the pores B are formed on a surface of the protruding channel represented by A. The average diameter of the pores B is about 0.75 μm. Thus, a pore B on the protruding channel A of the moth wing may be considered to be a $2^{nd}$ order unit in a range of $1 \times 10^{-7}$ m to $10 \times 10^{-7}$ m.

In FIG. 1, the sub-channels C are formed on a side surface of the pores B in each of the protruding channels A. The width of each of the sub-channels C is about 0.05 μm. Thus, a sub-channel C formed on a side surface of a pore B on a protruding channel A of the moth wing may be considered to be a $3^{rd}$ order unit in a range of $1 \times 10^{-8}$ m to $10 \times 10^{-8}$ m.

In the moth wing shown in FIG. 1, the channels A represented by the $1^{st}$ order unit, the pores B represented by the $2^{nd}$ order unit, and the sub-channels C represented by the $3^{rd}$ order unit are not formed independent of each other, but are formed on a surface of a structure represented by a higher order unit.

Based on this, the term "n type structures exist in a complex form" used herein can be understood such that n type structures different from each other do not exist individually, but co-exist such that a structure represented by a lower order unit is formed on a surface of or inside a structure represented by a higher order unit. Hereinafter, throughout the present specification including claims, the term "n type structures exist in a complex form" should be understood based on the above description. Herein, n may be a natural number that is 2 or greater. Herein, a specific material can be observed even to a molecular level, and thus the maximum value of n cannot be substantially defined.

The term "structures represented by at least one unit of $a^{th}$ order units" used herein should be understood as a structure of which length, width, diameter, and the like can be represented by at least one unit of $a^{th}$ order units as defined above. Examples of such structures include wires, shapeless powder, sunk or protruding channels, shapeless pores, or the like. Hereinafter, throughout the present specification including claims, the term "structures represented by at least one unit of $a^{th}$ order units" should be understood based on the above description.

The transition metal of the lithium-transition metal complex compound having an $n^{th}$ order hierarchical structure may be any transition metal suitable for use as an electrode active material of a lithium battery without particular limitation. Examples of the transition metal include at least one selected from the group consisting of Ti, Co, Ni, Al, Mn, V, Sn, Cr, Fe, Nb, Mo, Pd, Cd, In, Ge, W, Si, Sb, and Mg, but the transition metal not limited thereto.

The lithium-transition metal complex compound may be represented by one of the formulae selected from the group consisting of $Li_{1+\delta}Fe_{1-x}M_xPO_4$ where M is Mn, Ni, or Co, $-0.1 \leq \delta \leq 0.1$, $0 \leq x \leq 1$, an example of a compound of this formula being $LiFePO_4$; $Li_{1+\delta}Ni_xMn_xCo_{1-2x}O_2$ where $-0.1 \leq \delta \leq 0.1$ and $0 < x \leq 0.5$; $Li_{1+\delta}Ni_{1-x-y}Co_xM_yO_2$ where M is Al or Mg, $-0.1 \leq \delta \leq 0.1$, $0 \leq x \leq 1$, $0 \leq y \leq 0.2$, an example of a compound of this formula being $LiCoO_2$; $Li_{1+x}Mn_{2-x}O_4$ where $0 \leq x \leq 0.33$, an example of a compound of this formula being $LiMn_2O_4$; $Li_4Ti_5O_{12}$(LTO); $LiMnO_2$; or $LiNi_{0.5}Mn_{1.5}O_4$, but the lithium-transition metal complex compound is not limited thereto.

The $n^{th}$ order hierarchical structure of the lithium-transition metal complex compound may be derived from a natural material.

Figure 3A:
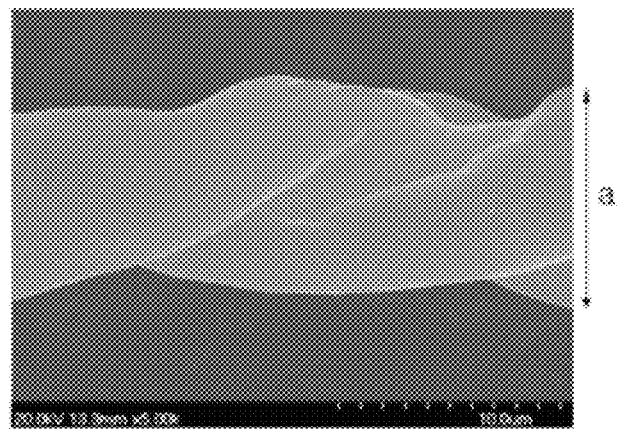
FIG. 3A is a SEM image of carbonized cotton.

The expression "the $n^{th}$ order hierarchical structure of the lithium-transition metal complex compound may be derived from a natural material" used herein indicates that the lithium-transition metal complex compound has a hierarchical structure of the natural material, or further comprises another structure that can be represented by at least one unit of $a^{th}$ order units as described above, in addition to the hierarchical structure of the natural material. For example, referring to FIG. 3D showing an image of $Li_4Ti_5O_{12}$ (LTO) prepared in Preparation Example 1, which will be described later, the LTO has wire and channel structures of a hierarchical structure of cotton as a template, and may also further have a pore structure that does not exist in the hierarchical structure of cotton. Hereinafter, throughout the present specification including claims, the expression "the $n^{th}$ order hierarchical structure of the lithium-transition metal complex compound may be derived from a natural material" should be understood based on the above description.

The natural material may be any material having a hierarchical structure, without particular limitation. Examples of the natural material may include cotton, paper, woven fabrics, wood, pollen, starch, sugar beet, grass, wings of insects, egg inner shell, hair, squid bones, bacteria, chitin, sea urchin, diatoms, and the like, but the natural material is not limited thereto.

According to an embodiment, the lithium-transition metal complex compound may have a $3^{rd}$ order hierarchical structure in which the following structures exist in a complex form: a shapeless particle structure having a diameter represented by a $1^{st}$ order unit in the range of $1 \times 10^{-6}$ m to $10 \times 10^{-6}$ m; a channel structure having a width represented by a $2^{nd}$ order unit in the range of $1 \times 10^{-7}$ m to $10 \times 10^{-7}$ m, a $3^{rd}$ order unit in the range of $1 \times 10^{-8}$ m to $10 \times 10^{-8}$ m, or a $4^{th}$ order unit in a range of $1 \times 10^{-9}$ m to $10 \times 10^{-9}$ m; and a shapeless pore structure having a lengthwise diameter represented by a $2^{nd}$ order unit in the range of $1 \times 10^{-7}$ m to $10 \times 10^{-7}$ m, a $3^{rd}$ order unit in the range of $1 \times 10^{-8}$ m to $10 \times 10^{-8}$ m, or a $4^{th}$ order unit in the range of $1 \times 10^{-9}$ m to $10 \times 10^{-9}$ m.

The lithium-transition metal complex compound described above may further comprise a carbonized natural material. The $n^{th}$ order hierarchical structure of the lithium-transition metal complex compound may be derived from the $n^{th}$ order hierarchical structure of the natural material. That is, the "natural material" may be a template used in synthesizing the lithium-transition metal complex compound having an $n^{th}$ order hierarchical structure. Examples of the natural material may include, as described above, cotton, paper, woven fabrics, wood, pollen, starch, sugar beet, grass, wings of insects, egg inner shell, hair, squid bones, bacteria, chitin, sea urchin, diatoms, and the like, but are not limited thereto.

The term "a carbonized natural material" used herein refers to a carbonaceous material obtained as a result of heat treating the natural material in an inert atmosphere. The heat treatment conditions used in the preparation of the carbonized natural material may be conditions where the lithium-transition metal complex compound can be synthesized from a mixture comprising a lithium source, a transition metal source, and a solvent. For example, the heat treatment may be performed under conditions, such as an inert atmosphere, a heating rate of 1° C./min to 10° C./min, a final temperature of 300-1200° C., and a heat-treating time of 0.5-48 hours (for example, first heat treatment conditions that will be described later), but the conditions are not limited thereto. The heat treatment conditions used in the preparation of the carbonized natural material may vary according to the types and amounts of the natural material, lithium source and transition metal source used.

The carbonized natural material has an $n^{th}$ order hierarchical structure in which n type structures represented by at least one unit of $a^{th}$ order units in a range of $1 \times 10^{-(a+5)}$ m to $10 \times 10^{-(a+5)}$ m exist in a complex form, wherein n is a natural number that is 2 or greater, and a is a natural number in a range of 1 to 5.

More particularly, the carbonized natural material may have a $3^{rd}$ order hierarchical structure in which the following structures exist in a complex form: a shapeless particle structure having a diameter represented by a $1^{st}$ order unit in the range of $1 \times 10^{-6}$ m to $10 \times 10^{-6}$ m; a channel structure having a width represented by a $2^{nd}$ order unit in the range of $1 \times 10^{-7}$ m to $10 \times 10^{-7}$ m, a $3^{rd}$ order unit in the range of $1 \times 10^{-8}$ m to $10 \times 10^{-8}$ m, or a $4^{th}$ order unit in a range of $1 \times 10^{-9}$ m to $10 \times 10^{-9}$ m; and a shapeless pore structure having a lengthwise diameter represented by a $2^{nd}$ order unit in the range of $1 \times 10^{-7}$ m to $10 \times 10^{-7}$ m, a $3^{rd}$ order unit in the range of $1 \times 10^{-8}$ m to $10 \times 10^{-8}$ m, or a $4^{th}$ order unit in the range of $\times 10^{-9}$ m to $10 \times 10^{-9}$ m, but the structure of the carbonized natural material is not limited thereto.

One or more embodiments include a method of preparing the lithium-transition metal complex compound having an $n^{th}$ order hierarchical structure as described above, the method including: preparing a mixture comprising a lithium source, a transition metal source, and a solvent; preparing a natural material as a template; and heat treating the mixture and the natural material in contact with each other to obtain a lithium-transition metal complex compound having an $n^{th}$ order hierarchical structure in which n type structures represented by at least one unit of $a^{th}$ order units in the range of $1 \times 10^{-(a+5)}$ m to $10 \times 10^{-(a+5)}$ m exist in a complex form, wherein n is a natural number that is 2 or greater, and a is a natural number in the range of 1-10.

Examples of the lithium source may include conventional lithium precursors such as LiOH, $CH_3COOLi$, $Li_2CO_3$, LiCl, and the like. Examples of the transition metal source may include $M(R_1)_r$, $M(Ha)_q$, $M(NO_3)_w$, $M(CH_3COO)_z$ (herein, M is selected from the group consisting of Ti, Co, Ni, Al, Mn, V, Sn, Cr, Fe, Nb, Mo, Pd, Cd, In, Ge, W, Si, Sb, and Mg, $R_1$ is a $C_1$-$C_{20}$ alkoxy group, Ha is a halogen atom, and r, q, w, and z are each independently 1, 2, 3, 4, or 5), and the like. As specific examples, the transition metal source may be $Ti(iPrO)_4$, $Ti(OBu)_4$, $TiCl_4$, $Fe(NO_3)_3$, $Fe(CH_3COO)_2$, $FeC_2O_4$, or $FeCl_2$, but the transition metal source is not limited thereto.

The solvent may be a medium that facilitates the lithium source and the transition metal source to react with each other as a result of heat treatment so as to form a lithium-transition metal complex compound. The solvent may be removed in the course of the heat treatment. Examples of the solvent may include conventional solvents such as water, alcohol (for example, methanol, ethanol, propanol, and the like), ketone (for example, acetone, methyl-ethyl ketone), acetic acid, ether, ethyl acetate, tetrahydrofuran, chloroform, dichloromethane, and the like, but the solvent is not limited thereto.

Next, the natural material as described above is prepared as a template. The natural material has an $n^{th}$ order hierarchical structure, and a lithium-transition metal complex compound to which the $n^{th}$ order hierarchical structure of the natural material is transferred can be obtained. A lithium-transition metal complex compound comprising the carbonized natural material can also be obtained, and the carbonized natural material may also have the $n^{th}$ order hierarchical structure of the natural material.

The contacting of the mixture comprising the lithium source, the transition metal source, and solvent with the natural material is not particularly limited, and may be performed using one of a plurality of methods such as immersion, spraying, or the like.

Next, the mixture comprising the lithium source, the transition metal source, and solvent and the natural material are heat treated while contacting each other. In the heat treatment, the lithium source and the transition metal source are used as a starting material, and synthesis of a lithium-transition metal complex compound having an $n^{th}$ order hierarchical structure derived from the natural material and carbonizing of the natural material may be performed and removal of the carbonized natural material may be selectively performed.

The synthesis of the lithium-transition metal complex compound from the lithium source and the transition metal source, the transfer of the hierarchical structure of the natural material to the lithium-transition metal complex compound, and the removal of the natural material (in the removal of the natural material, carbonizing of the natural material and the removal of the carbonized natural material are simultaneously performed) may be simultaneously performed in an air atmosphere at a heating rate of 0.1° C./min to 5° C./min (heating starts at room temperature) up to a final temperature of 300° C. to 1200° C. for a heat-treating time of 0.5 to 200 hours (including the heating time). However, such conditions may vary according to the lithium source, transition metal source and natural material used.

Alternatively, a first heat treatment process may be performed in which the synthesis of the lithium-transition metal complex compound from the lithium source and the transition metal source, and the transfer of the hierarchical structure of the natural material to the lithium-transition metal complex compound are performed, and the natural material is carbonized to obtain a lithium-transition metal complex compound comprising the carbonized natural material. That is, as a result of the first heat treatment process, the lithium-transition metal complex compound comprising the carbonized natural material can be obtained, and both the carbonized natural material and the lithium-transition metal complex compound may have an original $n^{th}$ order hierarchical structure of the natural material. The lithium-transition metal complex compound comprising the carbonized natural material may be used in at least one of an anode or a cathode of lithium batteries.

The first heat treatment process may be performed, for example, in an inert atmosphere at a heating rate of about 1° C./min to about 10° C./min (heating may start at room temperature) up to a final temperature of about 300° C. to about 1200° C. for a heat-treating time of about 0.5 to about 48 hours (including the heating time). However, such conditions may vary according to the lithium source, transition metal source and natural material used. After the first heat treatment process, the natural material is carbonized, and coexists with the lithium-transition metal complex compound. Thus, after the first heat treatment process, the lithium-transition metal complex compound comprising the carbonized natural material, which is a template, can be obtained.

Subsequently, if it is desired that the carbonized natural material be removed, a second heat treatment process in which the carbonized natural material is selectively removed may further be performed. As a result, the lithium-transition metal complex compound from which the carbonized natural material is removed can be obtained. The second heat treatment process may be performed, for example, in an air atmosphere at a heating rate of about 0.5° C./min to about 5° C./min (heating starts at room temperature) up to a final temperature of about 300° C. to about 1000° C. for a heat-treating time of about 0.5 to about 48 hours (including the heating time). However, such conditions may vary according to the lithium source, transition metal source and natural material used.

The method of preparing the lithium-transition metal complex compound having an $n^{th}$ order hierarchical structure as described above is highly reproducive and reliable, and uses as a template a natural material selected from natural materials having a variety of hierarchical structures, so that a lithium-transition metal complex compound having various hierarchical structures can be prepared.

The lithium-transition metal complex compound having an $n^{th}$ order hierarchical structure (including the lithium-transition metal complex compound having an $n^{th}$ order hierarchical structure comprising the carbonized natural material having an $n^{th}$ order hierarchical structure) and the lithium-transition metal complex compound having an $n^{th}$ order hierarchical structure prepared using the preparation method as described above (including the lithium-transition metal complex compound having an $n^{th}$ order hierarchical structure comprising the carbonized natural material having an $n^{th}$ order hierarchical structure prepared by the first heat treatment process as described above) have a structure in which the diffusion length of lithium ions is short and the total surface area thereof is relatively small, due to the $n^{th}$ order hierarchical structure. Therefore, the lithium-transition metal complex compound having an $n^{th}$ order hierarchical structure can be used in at least one of an anode and a cathode of secondary batteries, particularly, lithium batteries. In this regard, the lithium-transition metal complex compound having an $n^{th}$ order hierarchical structure comprising the carbonized natural material having an $n^{th}$ order hierarchical structure and the lithium-transition metal complex compound having an $n^{th}$ order hierarchical structure comprising the carbonized natural material having an $n^{th}$ order hierarchical structure prepared by the first heat treatment process as described above further comprise a carbonaceous material, such as the carbonized natural material, in addition to the lithium-transition metal complex compound. Thus, when they are used in lithium batteries, conductivity improvement due to the carbonized natural material can be obtained.

A lithium battery in which the lithium-transition metal complex compound having an $n^{th}$ order hierarchical structure or the lithium-transition metal complex compound having an $n^{th}$ order hierarchical structure comprising the carbonized natural material having an $n^{th}$ order hierarchical structure is used in a cathode can be manufactured as follows.

First, the lithium-transition metal complex compound having an $n^{th}$ order hierarchical structure or the lithium-transition metal complex compound having an $n^{th}$ order hierarchical structure prepared using the preparation method as described above as an active material, a conducting agent, a binder, and a solvent are mixed to prepare a cathode active material composition. Then, the cathode active material composition is directly coated on an Al current collector and dried to prepare a cathode plate.

Next, an anode active material, a conducting agent, a binder, and a solvent are mixed to prepare an anode active material composition. The anode active material composition is directly coated on a copper current collector and dried to prepare an anode plate. Alternatively, the anode active material composition may be cast on a separate support, and then a film formed of the anode active material delaminated from the support may be laminated on the copper current collector to prepare an anode plate.

The solvent used in forming the active cathode material or the active anode material may be any solvent that can be used in conventional compositions for forming an active material layer. Examples of the solvent may include a chain-type carbonate, such as dimethyl carbonate, ethylmethyl carbonate, diethyl carbonate and dipropyl carbonate, dimethoxyethane, diethoxyethane, fatty acid ester derivatives, a cyclic carbonate, such as ethylene carbonate, propylene carbonate and butylene carbonate, γ-butyrolactone, N-methylpyrrolidone, acetone, NMP, and water. In this regard, one or a combination of at least two of the above materials may be used as the solvent.

The binder may be any known binder used to form an active material layer. Examples of the binder may include a vinylidene fluoride/hexafluoropropylene copolymer, polyvinylidene fluoride, polyacrylonitrile, polymethylmethacrylate, polytetrafluoroethylene, mixtures of these materials, and a styrene butadiene rubber polymer, but is not limited thereto. The amount of the binder may be within general ranges for forming an active material layer.

The anode active material may be any anode active material known in the art. Examples of the anode active material may include a metal-based anode active material, a carbon-based anode active material, and a composite anode active material thereof. The carbon-based anode active material may comprise at least one selected from the group consisting of graphite, natural graphite, artificial graphite, soft carbon and hard carbon. The metal-based anode active material may comprise at least one metal selected from the group consisting of Si, Sn, Al, Ge, Pb, Zn, Ag and Au, or an alloy thereof. The composite anode active material including both the carbon-based and metal-based anode active materials may be prepared by mixing the carbon-based anode active material and the metal-based anode active material by mechanical treatment such as ball milling, or the like. If necessary, processes such as heat treatment, and the like may be further performed. The anode active material may be preferably a Si/C composite anode active material or a Sn/C composite anode active material. The conducting agent, the binder, and the solvent in the anode active material composition are the same as those in the cathode active material composition. Here, the amounts of the anode active material, the conducting agent, the binder, and the solvent may be amounts that are commonly used in a lithium battery.

Alternatively, an electrode formed of a Li metal can be used as an anode plate. Various other modifications are also possible.

Any separator that is commonly used for lithium batteries can be used. In particular, the separator used may have low resistance to the migration of ions in an electrolyte and have an excellent electrolyte-retaining ability. Examples of the separator include glass fiber, polyester, TEFLON, polyethylene, polypropylene, polytetrafluoroethylene (PTFE), a combination thereof. The material used in the separator may be in non-woven or woven fabric form.

The separator is interposed between the cathode plate and the anode plate to form an electrode assembly. The electrode assembly is wound or folded and then sealed in a cylindrical or rectangular battery case. Then, an electrolytic solution is injected into the battery case to complete the manufacture of a lithium ion battery. Alternatively, a plurality of electrode assemblies may be stacked in a bi-cell structure and impregnated with an electrolytic solution. The resultant is put into a pouch and hermetically sealed, thereby completing the manufacture of a lithium ion polymer battery.

The electrolytic solution includes a lithium salt and a mixed organic solvent of a high dielectric solvent and a low boiling point solvent, and if necessary, may further include a variety of additives such as an overcharge preventing agent.

The high dielectric solvent may be any high dielectric solvent that is commonly used in the art without limitation. Examples of the high dielectric solvent include a cyclic carbonate such as ethylene carbonate, propylene carbonate, and butylene carbonate, and γ-butyrolactone.

The low boiling point solvent may be any low boiling point solvent that is commonly used in the art. Examples of the low boiling point solvent include a chain-type carbonate such as dimethyl carbonate, ethylmethyl carbonate, diethyl carbonate (DEC), and dipropyl carbonate, dimethoxyethane, diethoxyethane, and fatty acid ester derivatives, but the low boiling point solvent is not limited thereto.

At least one hydrogen atom existing in each of the high dielectric solvent and the low boiling point solvent may be substituted with a halogen atom such as fluorine.

The mixed volume ratio of the high dielectric solvent and the low boiling point solvent may be in a range of about 1:1 to about 1:9. When the mixed volume ratio is outside this range, discharging capacity and charge-discharge cycles may be decreased.

In addition, the lithium salt used in the organic electrolytic solution may be any lithium salt that is commonly used in lithium batteries. The lithium salt may comprise at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

The concentration of the lithium salt of the organic electrolytic solution may be in a range of about 0.5 to about 2 M. When the concentration of the lithium salt is less than 0.5 M, the conductivity of the organic electrolytic solution may be decreased, and thus the performance of the organic electrolytic solution may be poor. When the concentration of the lithium salt is greater than 2.0 M, the viscosity of the organic electrolytic solution may be increased, and thus the mobility of lithium ions may be decreased.

Exemplary embodiments will now be described in more detail with reference to the following examples. However, these examples are for illustrative purposes only and are not intended to limit the scope of the invention.

EXAMPLE

Preparation Example 1

0.38 g of LiOH and 5.3 g of Ti(iPrO)$_4$ were added to 6 g of EtOH, and then the mixture was dissolved until it became transparent. Cotton (product name: Dong-A cotton, manufacturer: DONG-A HEALTHCARE) having a size of 4 cm×4 cm×0.5 mm was immersed in the mixture to permeate the mixture into the cotton. The cotton with the mixture permeated thereinto was rolled, dried in a vacuum oven at room temperature, and put into a crucible. Then, the dried cotton was first heat treated at a heating rate of 3° C./min up to a final temperature of 850° C. for 12 hours in an argon atmosphere to prepare $Li_4Ti_5O_{12}$ and to carbonize the cotton, thereby producing $Li_4Ti_5O_{12}$ comprising the carbonized cotton. Then, the resultant was secondarily heat treated at a heating rate of 2° C./min up to a final temperature of 450° C. for 12 hours in an air atmosphere to remove the carbonized cotton. As a result, $Li_4Ti_5O_{12}$ having a hierarchical structure of the cotton was obtained.

Preparation Example 2

4.25 g of Ti(OBu)$_4$ was dissolved in 1 g of EtOH. Separately, 1.07 g of $CH_3COOLi.2H_2O$ was dissolved in 5 g of EtOH until the mixture became transparent, and then the resulting solution was added dropwise to the prepared solution in which Ti(OBu)$_4$ was dissolved in EtOH. Then, filter paper having a size of 11 cm×0.1 mm (product name: ADVANTEC, manufacturer: Toyo) was immersed in the mixed solution to permeate the mixed solution into the filter paper. The filter paper with the mixed solution permeated thereinto was rolled, dried in a vacuum oven at room temperature, and put into a crucible. Then, the dried filter paper was first heat treated at a heating rate of 3° C./min up to a final temperature of 850° C. for 12 hours in an argon atmosphere to prepare $Li_4Ti_5O_{12}$ and to carbonize the filter paper, thereby producing $Li_4Ti_5O_{12}$ comprising the carbonized filter paper. Then, the resultant was secondarily heat treated at a heating rate of 2° C./min up to a final temperature of 450° C. for 12 hours in an air atmosphere to remove the carbonized filter paper. As a result, $Li_4Ti_5O_{12}$ having a hierarchical structure of the filter paper was obtained.

Preparation Example 3

5.35 g of $CH_3COOLi.2H_2O$ and 12.5 g of $(CH_3COO)_2Co.4H_2O$ were added to 60 g of $H_2O$, and then the mixture was dissolved until it became transparent. Cotton (product name: Dong-A cotton, manufacturer: DONG-A HEALTHCARE) having a size of 4 cm×4 cm×0.5 mm was immersed in the mixture to permeate the mixture into the cotton. The cotton with the mixture permeated thereinto was rolled, dried in a vacuum oven at room temperature, and put into a crucible. Then, the dried cotton was first heat treated at a heating rate of 3° C./min up to a final temperature of 800° C. for 5 hours in an argon atmosphere to prepare $LiCoO_2$ and to carbonize the cotton, thereby producing $LiCoO_2$ comprising the carbonized cotton. Then, the resultant was secondarily heat treated at a heating rate of 2° C./min up to a final temperature of 450° C. for 12 hours in an air atmosphere to remove the carbonized cotton. As a result, $LiCoO_2$ having a hierarchical structure of the cotton was obtained.

Comparative Preparation Example 1

Commercially available $Li_4Ti_5O_{12}$ particles having average particle diameters in the range of about 0.3 μm to about 3 μm were obtained.

Comparative Preparation Example 2

Commercially available spherical $LiCoO_2$ particles each having an average particle diameter of about 20 μm were obtained.

Evaluation Example 1

Figure 2:
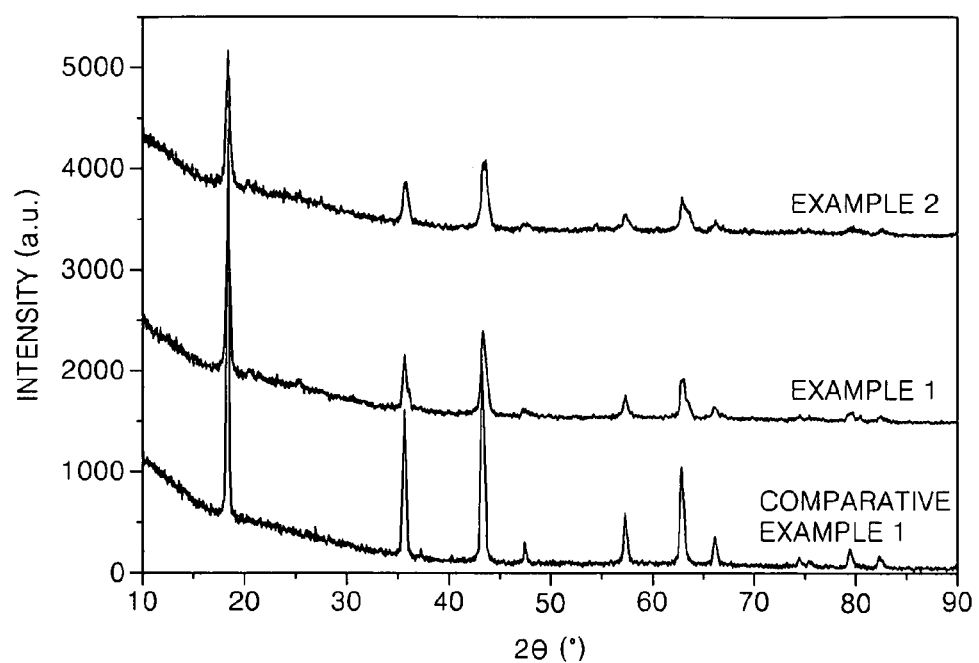
FIG. 2 is a graph showing x-ray diffraction (XRD) data of $Li_4Ti_5O_{12}$ of Preparation Examples 1 and 2 and $Li_4Ti_5O_{12}$ particles of Comparative Preparation Example 1.

The crystalline properties of $Li_4Ti_5O_{12}$ of Preparation Examples 1 and 2 and $Li_4Ti_5O_{12}$ particles of Comparative Preparation Example 1 were evaluated, and the results are shown in FIG. 2. The crystalline properties were evaluated at about 40 mA and 40 kV using an X-ray diffraction (XRD) device known as X'Pert Pro available from Philips.

FIG. 2 is a graph showing XRD data of the $Li_4Ti_5O_{12}$ of Preparation Examples 1 and 2 and $Li_4Ti_5O_{12}$ particles of Comparative Preparation Example 1. Referring to FIG. 2, the $Li_4Ti_5O_{12}$ of Preparation Examples 1 and 2 and the commercially available $Li_4Ti_5O_{12}$ particles of Comparative Preparation Example 1 have peaks with a similar intensity ratio at the same position. As a result, it can be seen that $Li_4Ti_5O_{12}$ was synthesized in Preparation Examples 1 and 2, respectively.

Evaluation Example 2

To compare the hierarchical structure of the cotton used in Preparation Example 1 with the hierarchical structure of the $Li_4Ti_5O_{12}$ prepared in Preparation Example 1, the same type of cotton used in Preparation Example 1 was rolled, put into a crucible, and first heat treated at 850° C. for 12 hours in an argon atmosphere to carbonize the cotton. Scanning electron microscopic (SEM) images of the carbonized cotton are shown in FIGS. 3A and 3C, respectively. For comparison, SEM images of the $Li_4Ti_5O_{12}$ of Preparation Example 1 are shown in FIGS. 3B and 3D, respectively, at the same magnifications as those of FIGS. 3A and 3C, respectively.

Referring to FIG. 3A, the cotton used as a template has a diameter of about 6.0 μm (for example, indicated by "a"). From this, it can be seen that the cotton has a wire structure having a diameter represented by a $1^{st}$ order unit in the range of $1\times10^{-6}$ m to $10\times10^{-6}$ m.

Figure 3B:
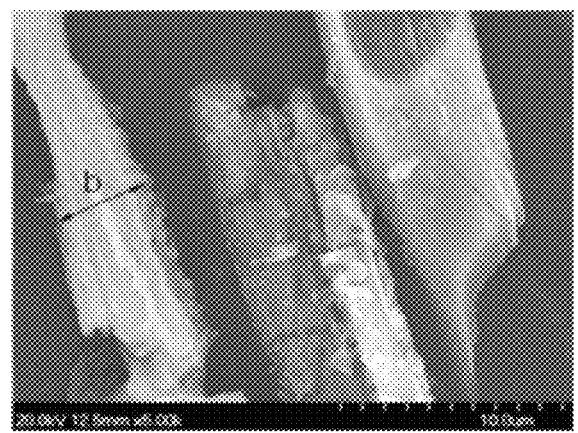
FIG. 3B is an image of $Li_4Ti_5O_{12}$ of Preparation Example 1 observed at the same magnification as that of FIG. 3A.
Figure 3C:
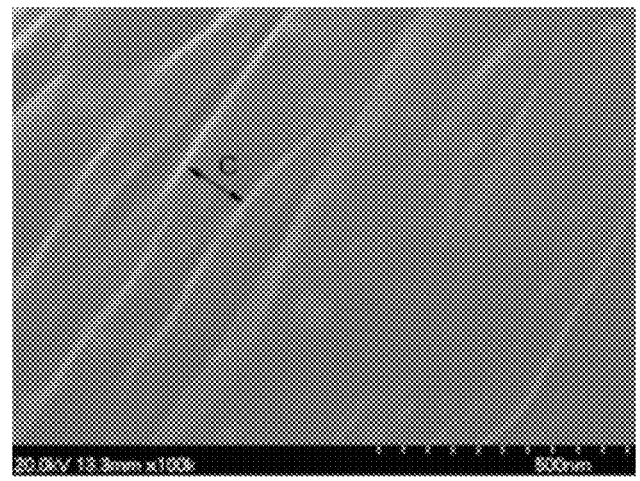
FIG. 3C is a SEM image of the carbonized cotton of FIG. 3A at a greater magnification.
Figure 3D:
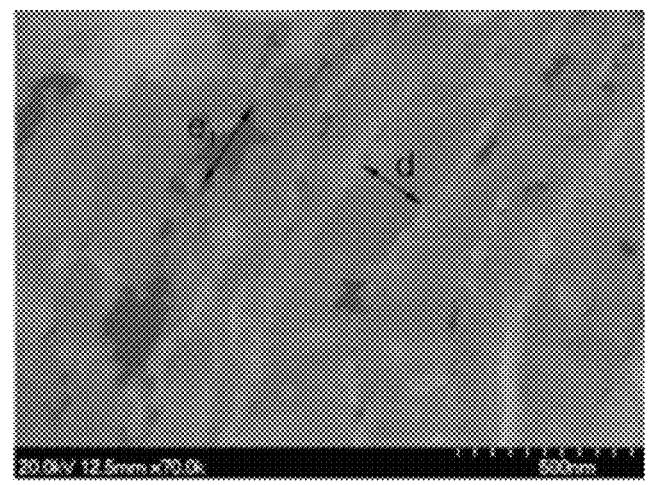
FIG. 3D is a SEM image of $Li_4Ti_5O_{12}$ of Preparation Example 1 observed at the same magnification as that of FIG. 3C.

Referring to FIG. 3B, the $Li_4Ti_5O_{12}$ of Preparation Example 1 has a diameter of about 3.0 μm (for example, indicated by "b"). From this, it can be seen that the $Li_4Ti_5O_{12}$ has a wire structure having a diameter represented by a $1^{st}$ order unit in the range of $1\times10^{-6}$ m to $10\times10^{-6}$ m.

Referring to FIG. 3C, the cotton used as a template has a plurality of channels (portions represented by gray) recessed between ridges (portions represented by white lines). In FIG. 3C, it can be seen that the width (for example, indicated by "c") of the channel can be represented by a $2^{nd}$ order unit in the range of $1\times10^{-7}$ m to $10\times10^{-7}$ m, a $3^{rd}$ order unit in the range of $1\times10^{-8}$ m to $10\times10^{-8}$ m, or a $4^{th}$ order unit in the range of $1\times10^{-9}$ m to $10\times10^{-9}$ m.

Referring to FIG. 3D, the $Li_4Ti_5O_{12}$ of Preparation Example 1 has a plurality of channels (portions represented by gray) recessed between ridges (portions represented by white line). In FIG. 3D, it can be seen that the width (for example, indicated by "d") of the channel can be represented by a $2^{nd}$ order unit in the range of $1\times10^{-7}$ m to $10\times10^{-7}$ m, a $3^{rd}$ order unit in the range of $1\times10^{-8}$ m to $10\times10^{-8}$ m, or a $4^{th}$ order unit in the range of $1\times10^{-9}$ m to $10\times10^{-9}$ m. In addition, the $Li_4Ti_5O_{12}$ of Preparation Example 1 has shapeless pores (portions represented by thick gray), and it can be seen that the lengthwise diameter (for example, indicated by "$e_1$") of the pores can be represented by a $2^{nd}$ order unit in the range of $1\times10^{-7}$ m to $10\times10^{-7}$ m, a $3^{rd}$ order unit in the range of $1\times10^{-8}$ m to $10\times10^{-8}$ m, or a $4^{th}$ order unit in the range of $1\times10^{-9}$ m to $10\times10^{-9}$ m.

From these results, it can be confirmed that the cotton used as a template has a $2^{nd}$ order hierarchical structure and that the $2^{nd}$ order hierarchical structure of the cotton is effectively transferred to the $Li_4Ti_5O_{12}$ of Preparation Example 1. Moreover, the $Li_4Ti_5O_{12}$ of Preparation Example 1 has a $3^{rd}$ order hierarchical structure by further having a pore structure as described above, in addition to the $2^{nd}$ order hierarchical structure of the cotton.

Figure 4A:
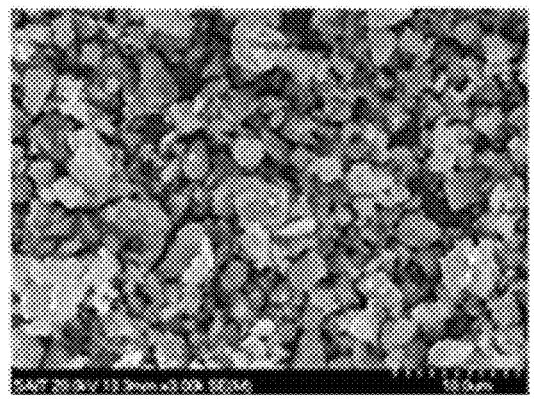
FIGS. 4A and 4B are SEM images of $Li_4Ti_5O_{12}$ particles of Comparative Preparation Example 1.
Figure 4B:
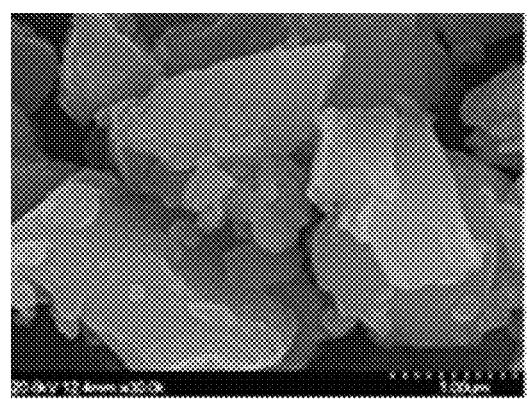

FIGS. 4A and 4B are SEM images of the $Li_4Ti_5O_{12}$ particles of Comparative Preparation Example 1, taken at the same magnifications as those of FIGS. 3A and 3C, respectively. Referring to FIGS. 4A and 4B, the $Li_4Ti_5O_{12}$ particles of Comparative Preparation Example 1 are shapeless, and do not include a different structure having a size unit different from the size unit of the $Li_4Ti_5O_{12}$ particle on a surface of the shapeless particles or inside the particles. Thus, it can be seen that the $Li_4Ti_5O_{12}$ particles of Comparative Preparation Example 1 do not have a hierarchical structure, unlike the $Li_4Ti_5O_{12}$ of Preparation Example 1.

Example 1

The $Li_4Ti_5O_{12}$ of Preparation Example 1 was pulverized to have an average particle diameter of about 2 μm. The pulverizing involved additionally pulverizing the $Li_4Ti_5O_{12}$ of Preparation Example 1, taking into consideration a size of an electrode. The $Li_4Ti_5O_{12}$ of Preparation Example 1 shown in FIG. 4B may be converted into shapeless particles through the pulverization process, but the average particle diameter thereof is about 2 μm, and thus can still be represented by a $1^{st}$ order unit. The pulverized $Li_4Ti_5O_{12}$ of Preparation Example 1 was mixed with SUPER P (a carbon black manufactured by MMM Carbon, Brussels, Belgium), and then a PVDF/NMP solution was added dropwise to the mixture and stirred to prepare a slurry for manufacturing an electrode (the weight ratio of the $Li_4Ti_5O_{12}$ of Preparation Example 1:SUPER P:PVDF was 82:10:8). The slurry was coated onto an Al substrate having a thickness of about 15 μm by bar-coating, and then the resultant was dried under reduced pressure at a high temperature, rolled, and punched to manufacture an electrode for a 2016 coin cell. The capacity of the electrode was 2 mAh/cm², and the thickness thereof was about 90 to about 100 μm.

The electrode manufactured as described above, an Li metal as a counter electrode, and 1.3M $LiPF_6$ EC/DEC (3/7) as an electrolytic solution were used to manufacture a half cell. To measure the capacity of the half cell, charging and discharging were performed at a rate of 0.2 C. To evaluate rapid charging characteristics, charging and discharging were performed at rates of 6 C and 0.5 C, respectively. To evaluate high power characteristics, charging and discharging were performed at rates of 0.5 C and 6 C, respectively.

Comparative Example 1

A cell was manufactured in the same manner as in Example 1, except that $Li_4Ti_5O_{12}$ particles of Comparative Preparation Example 1 were used instead of the $Li_4Ti_5O_{12}$ of Preparation Example 1. Charging and discharging were performed on the cell in the same manner as in Example 1.

Example 2

The $LiCoO_2$ of Preparation Example 3 was pulverized to have an average particle diameter of about 2 μm. The pulverized $LiCoO_2$ of Preparation Example 3 was mixed with SUPER P, and then a PVDF/NMP solution was added dropwise to the mixture and stirred to prepare a slurry for manufacturing an electrode (a weight ratio of $LiCoO_2$ of Preparation Example 3:SUPER P:PVDF is 96:2:2). The slurry was coated onto an Al substrate having a thickness of 15 μm by bar-coating, and then the resultant was dried under reduced pressure at a high temperature, rolled, and punched to manufacture an electrode for a 2016 coin cell. The capacity of the electrode was 3 mAh/cm², and the thickness thereof was about 60 to about 70 μm.

The electrode manufactured as described above, an Li metal as a counter electrode, and 1.3M $LiPF_6$ EC/DEC (3/7) as an electrolytic solution were used to manufacture a half cell. To measure the capacity of the half cell, charging and discharging were performed at a rate of 0.2 C. To evaluate high power characteristics, charging and discharging were performed at rates of 0.5 C and 6 C, respectively.

Comparative Example 2

An electrode was manufactured in the same manner as in Example 2, except that $LiCoO_2$ particles prepared in Comparative Preparation Example 2 were used instead of $LiCoO_2$ of Preparation Example 3.

Evaluation Example 3

Figure 5:
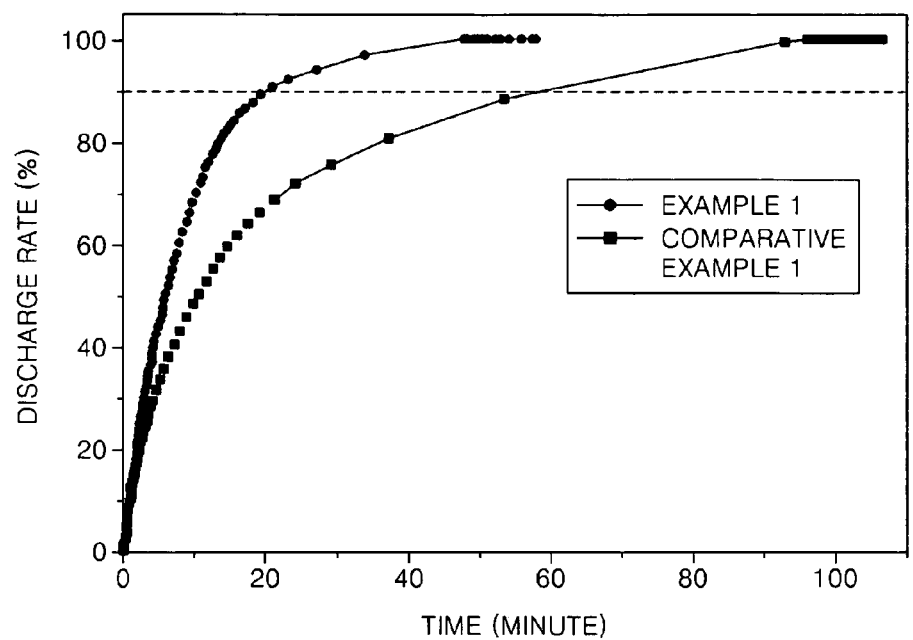
FIG. 5 is a graph showing the rapid charging characteristics of the cells manufactured in Example 1 and Comparative Example 1.

FIG. 5 shows curves when rapid charging was performed on cells of Example 1 and Comparative Example 1 at a rate of 6 C. Referring to FIG. 5, it can be seen that it takes about 59 minutes to charge 90% of the rated capacity (standard charging rate of 0.2 C) of the cell of Comparative Example 1, while it takes about 21 minutes to charge 90% of the rated capacity (standard charging rate of 0.2 C) of the cell of Example 1.

Figure 6:
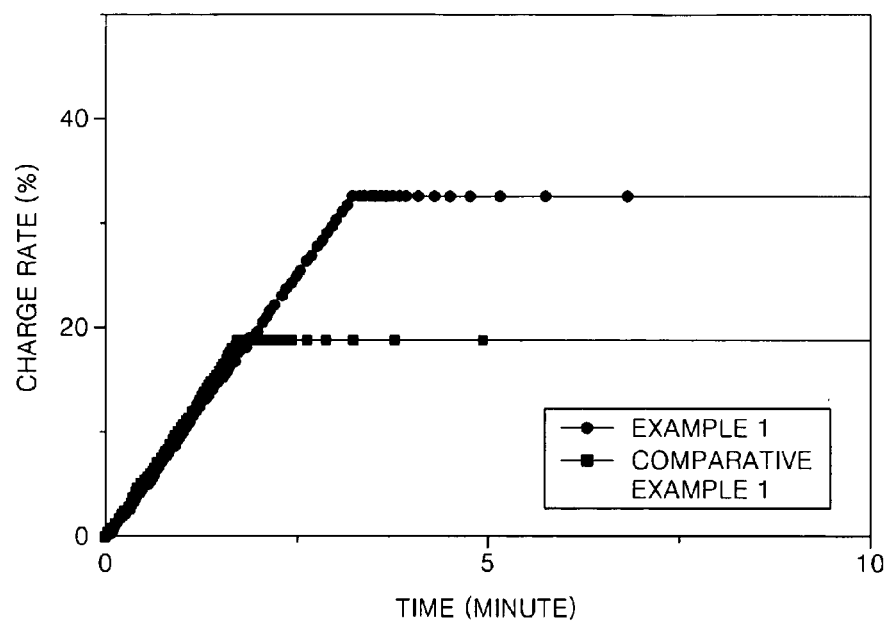
FIG. 6 is a graph showing the high power characteristics of the cells manufactured in Example 1 and Comparative Example 1.

FIG. 6 is a graph showing high power characteristics of the cells of Example 1 and Comparative Example 1. Referring to FIG. 6, it can be seen that high power characteristics of the cell of Comparative Example 1 is about 19%, while high power characteristics of the cell of Example 1 is about 33%.

Figure 7:
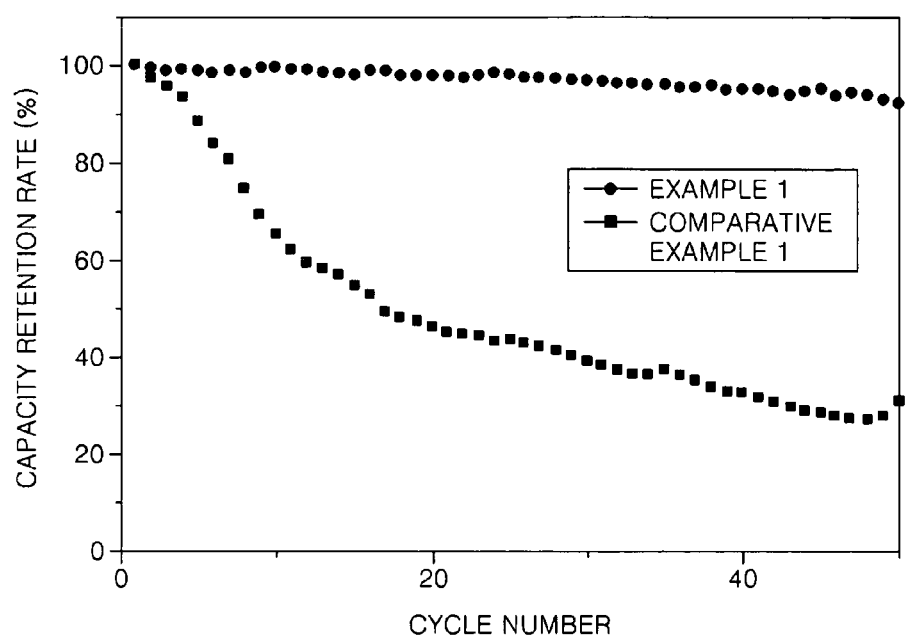
FIG. 7 is a graph showing the cycle characteristics of the cells manufactured in Example 1 and Comparative Example 1.

FIG. 7 is a graph showing cycle characteristics of the cells of Example 1 and Comparative Example 1. To evaluate the cycle characteristics thereof, each of the cells of Example 1 and Comparative Example 1 was charged at a rate of 6 C and discharged at a rate of 0.5 C, and the cycle was repeated 50 times. Referring to FIG. 7, it can be confirmed that after the cells were charged and discharged 50 times, the cell of Comparative Example 1 maintained about 31% of initial capacity, while the cell of Example 1 maintained about 92% of initial capacity.

Figure 8:
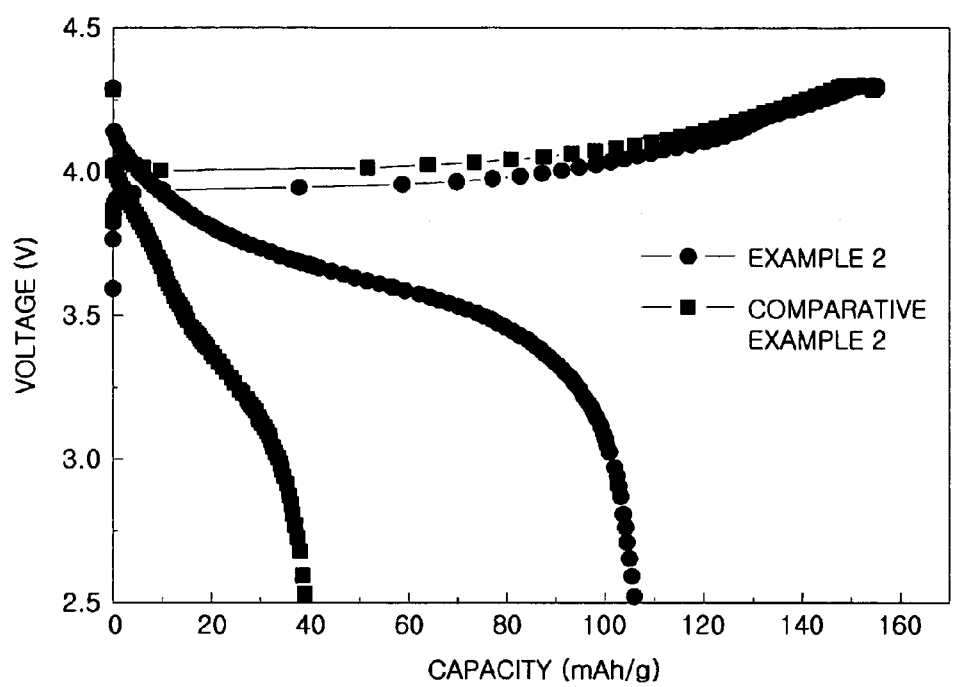
FIG. 8 is a graph showing the high power characteristics of the cells of Example 2 and Comparative Example 2.

FIG. 8 is a graph showing high power characteristics of the cells of Example 2 and Comparative Example 2 when the cells are discharged at a rate of 6 C. Referring to FIG. 8, the cell of Comparative Example 2 exhibited about 62% of the rated energy density (standard discharging rate of 0.2 C) at a discharging rate of 6 C, while the cell of Example 2 exhibited about 22% of the rated energy density (standard discharging rate of 0.2 C) at a discharging rate of 6 C.

As described above, according to the one or more of the above embodiments, when the lithium-transition metal complex compound having an $n^{th}$ order hierarchical structure, or the lithium-transition metal complex compound having an $n^{th}$ order hierarchical structure prepared using the method as described above is included in an electrode of a lithium battery, rapid mass diffusion is possible. Thus, a lithium battery including the electrode can have improved rapid charging characteristics, high power characteristics, and cycle characteristics. In addition, the method of preparing a lithium-transition metal complex compound having an $n^{th}$ order hierarchical structure uses a bio template such as a natural material, and thus the preparation method is highly reproductive and reliable, and the manufacturing costs are inexpensive. Moreover, the bio template has a variety of types, and thus a variety of $n^{th}$ order hierarchical structures can be embodied.

Although a few embodiments have been shown and described, it would be appreciated by those skilled in the art that changes may be made in these embodiment without departing from the principles and spirit of the invention, the scope of which is defined in the claims and their equivalents.

What is claimed is:

1. A lithium-transition metal complex compound-containing material having an $n^{th}$ order hierarchical structure in which n type structures, selected from wires, particles, channels and pores, represented by at least one unit of $a^{th}$ order units in a range of $1 \times 10^{-(a+5)}$ m to $10 \times 10^{-(a+5)}$ m exist in a complex form, wherein n is a natural number that is 2 or greater, and a is a natural number in a range of 1 to 5.

2. The lithium-transition metal complex compound-containing material of claim 1, wherein the transition metal is selected from the group consisting of Ti, Co, Ni, Al, Mn, V, Sn, Cr, Fe, Nb, Mo, Pd, Cd, In, Ge, W, Si, Sb, and Mg.

3. The lithium-transition metal complex compound-containing material of claim 1, wherein the compound is represented by one of the formulae selected from the group consisting of $0 \leq x \leq 1$; $Li_{1+\delta}Ni_xMn_xCo_{1-2x}O_2$ where $-0.1 \leq \delta \leq 0.1$ and $0 < x \leq 0.5$; $Li_{1+\delta}Ni_{1-x-y}Co_xM_yO_2$ where M is Al or Mg, $-0.1 \leq \delta \leq 0.1$, $0 \leq x \leq 1$, $0 \leq y \leq 0.2$; $Li_{1+x}Mn_{2-x}O_4$ where $0 \leq x \leq 0.33$; $Li_4Ti_5O_{12}$(LTO); $LiMnO_2$; and $LiNi_{0.5}O_4$.

4. A lithium-transition metal complex compound-containing material having an $n^{th}$ order hierarchical structure in which n type structures represented by at least one unit of $a^{th}$ order units in a range of $1 \times 10^{-(a+5)}$ m to $10 \times 10^{-(a+5)}$ m exist in a complex form, wherein n is a natural number that is 2 or greater, and a is a natural number in a range of 1 to 5, and wherein the $n^{th}$ order hierarchical structure is derived from a natural material template selected from the group consisting of cotton, paper, woven fabrics, wood, pollen, grass, wings of insects, egg inner shell, hair, squid bones, bacteria, chitin, sea urchin, and diatoms.

5. The lithium-transition metal complex compound-containing material of claim 1, having a $3^{rd}$ order hierarchical structure in which the following three structures of the lithium-transition metal complex compound exist in a complex form:
- a shapeless particle structure having a diameter represented by a $1^{st}$ order unit in the range of $1\times10^{-6}$ m to $10\times10^{-6}$ m;
- a channel structure having a width represented by a $2^{nd}$ order unit in the range of $1\times10^{-7}$ m to $10\times10^{-7}$ m, a $3^{rd}$ order unit in the range of $1\times10^{-8}$ m to $10\times10^{-8}$ m, or a $4^{th}$ order unit in a range of $1\times10^{-9}$ m to $10\times10^{-9}$ m; and
- a shapeless pore structure having a lengthwise diameter represented by a $2^{nd}$ order unit in the range of $1\times10^{-7}$ m to $10\times10^{-7}$ m, a $3^{rd}$ order unit in the range of $1\times10^{-8}$ m to $10\times10^{8}$ m, or a $4^{th}$ order unit in the range of $1\times10^{-9}$ m to $10\times10^{-9}$ m.

6. A composite material comprising the lithium-transition metal complex compound-containing material of claim 1 and further comprising a carbonized natural material selected from the group consisting of cotton, paper, woven fabrics, wood, pollen, grass, wings of insects, egg inner shell, hair, squid bones, bacteria, chitin, sea urchin, and diatoms, wherein the $n^{th}$ order hierarchical structure of the lithium-transition metal complex compound-containing material is derived from the natural material.

7. The composite material of claim 6, wherein the carbonized natural material has an $n^{th}$ order hierarchical structure in which n type structures of the carbonized natural material represented by at least one unit of $a^{th}$ order units in a range of $1\times10^{-(a+5)}$ m to $10\times10^{-(a+5)}$ m exist in a complex form, wherein n is a natural number that is 2 or greater, and a is a natural number in a range of 1 to 5.

8. The composite material of claim 6, wherein the carbonized natural material has a $3^{rd}$ order hierarchical structure in which the following structures of the carbonized natural material exist in a complex form: a shapeless particle structure having a diameter represented by a $1^{st}$ order unit in the range of $1\times10^{-6}$ m to $10\times10^{-6}$ m; a channel structure having a width represented by a $2^{nd}$ order unit in the range of $1\times10^{-7}$ m to $10\times10^{-7}$ m, a $3^{rd}$ order unit in the range of $1\times10^{-8}$ m to $10\times10^{-8}$ m, or a $4^{th}$ order unit in a range of $1\times10^{-9}$ m to $10\times10^{-9}$ m; and a shapeless pore structure having a lengthwise diameter represented by a $2^{nd}$ order unit in the range of $1\times10^{-7}$ m to $10\times10^{-7}$ m, a $3^{rd}$ order unit in the range of $1\times10^{-8}$ m to $10\times10^{-8}$ m, or a $4^{th}$ order unit in the range of $1\times10^{-9}$ m to $10\times10^{-9}$ m.

9. A lithium battery comprising an anode, a cathode, and an electrolytic solution, wherein at least one of the anode and the cathode comprises the lithium-transition metal complex compound-containing material according to claim 1.

* * * * *

UNITED STATES PATENT AND TRADEMARK OFFICE
CERTIFICATE OF CORRECTION

PATENT NO. : 8,349,286 B2
APPLICATION NO. : 12/399120
DATED : January 8, 2013
INVENTOR(S) : Yoonsok Kang et al.

It is certified that error appears in the above-identified patent and that said Letters Patent is hereby corrected as shown below:

Column 14, line 55,
"$Li_{1+\delta}Ni_{1-x-y}Co_xM_yO_2$ where" should read --$Li_{1+\delta}Ni_{1-x-y}Co_xM_yO_2$ where--;

Column 15, line 20,
"$10\times10^8$" should be --$10\times10^{-8}$--.

Signed and Sealed this
Ninth Day of April, 2013

Teresa Stanek Rea
*Acting Director of the United States Patent and Trademark Office*